United States Patent
Gerber et al.

(10) Patent No.: US 6,897,283 B2
(45) Date of Patent: May 24, 2005

(54) POLYHYDROXYL-COMPOSITIONS DERIVED FROM CASTOR OIL WITH ENHANCED REACTIVITY SUITABLE FOR POLYURETHANE-SYNTHESIS

(75) Inventors: Ulrich Gerber, Uitikon-Waldegg (CH); Werner Meyer, Zollikon (CH); Paul Schelbert, Ottenbach (CH)

(73) Assignee: Sika Schweiz AG, Zurich (CH)

( * ) Notice: Subject to any disclaimer, the term of this patent is extended or adjusted under 35 U.S.C. 154(b) by 269 days.

(21) Appl. No.: 09/916,485

(22) Filed: Jul. 30, 2001

(65) Prior Publication Data

US 2002/0035235 A1 Mar. 21, 2002

(30) Foreign Application Priority Data

Aug. 1, 2000 (EP) .............................. 00116566

(51) Int. Cl.⁷ .............................. C08G 63/16
(52) U.S. Cl. ....................................... 528/302
(58) Field of Search ......................... 528/302

(56) References Cited

U.S. PATENT DOCUMENTS

| 4,789,705 A | 12/1988 | Kase et al. |
| 5,468,802 A | 11/1995 | Wilt et al. |

FOREIGN PATENT DOCUMENTS

| JP | 10330470 | * 12/1998 |
| JP | 410330470 | * 12/1998 |

* cited by examiner

*Primary Examiner*—Cecilia J. Tsang
*Assistant Examiner*—Taylor Victor Oh
(74) *Attorney, Agent, or Firm*—Burns, Doane, Swecker & Mathis, L.L.P.

(57) ABSTRACT

A reactive polyester polyol is described that is obtainable by half ester formation starting from at least one dicarboxylic anhydride and at least one hydroxyl group carrying, saturated or unsaturated fatty acid and/or a respective ester, in particular castor oil and/or ricinoleic acid, as well as final esterification by at least one polyol.

22 Claims, No Drawings

POLYHYDROXYL-COMPOSITIONS DERIVED FROM CASTOR OIL WITH ENHANCED REACTIVITY SUITABLE FOR POLYURETHANE-SYNTHESIS

CROSS REFERENCE TO RELATED APPLICATIONS

This application claims the priority of European patent application 00 116 566.1, filed $1^{st}$ Aug. 2000, the disclosure of which is incorporated herein by reference in its entirety.

FIELD OF THE INVENTION

The present invention concerns new lipid modified polhydroxyl compounds derived from castor oil, there production and use for the formulation of reactive polyurethane-compositions, in particular for coatings, floorings and adhesives.

BACKGROUND OF THE INVENTION

Polyurethanes, resulting from the polyaddition of polyisocyanates and polyhydroxyl compounds, are broadly used in the form of reactive one or two component systems as adhesives, sealing materials, decorative or protective coatings and floorings. In all these applications their resistance against ageing and attack by chemical substances, such as for example water, are of great importance. For this reason, a high hydrophobicity of the binder is desired in order to reduce the effects of polar chemicals on the coating or the adhesive. In addition to the chemical resistance, in particular for coatings, aesthetic aspects are of great importance. Therefore, defect-free surfaces are important and for floorings intended for application outside of buildings a resistance against yellowing due to exposition to UV-radiation is required.

Besides of these requirements directed to the features of the cured products, high reactivity or short curing times at room temperature are important, since thereby the processing times can be shortened and the costs of the bound money can be reduced. Furthermore, for the applications in building construction, a sufficiently high reactivity of the systems is a necessity for applications at temperatures around 10° C. This is of great importance since in a lot of geographic regions the average of the application temperatures during a great part of the year is in this range.

It is known for a long time that because of its high hydrophobicity castor oil is a very suitable polyol for two component polyurethane systems. Thereby castor oil is often used mixed with other polyols. By epoxydation and thereon following cleavage of the ring with glycols, castor oil and other plant oils can be reacted to as well hydrophobic polyols, that are suitable for the application in two component polyurethane systems. The patent documents WO 96/06123, U.S. Pat. No. 5,512,655 and DE 4308097 describe such polyols. EP 0 798 325 describes a further polyol that is obtained by reaction of castor oil with aromatic polyesters.

Castor oil and the derivatives thereof (such as ricinoleic acid, methylricinoleate, 12-hydroxy stearic acid methyl ester), as well as the above described reaction products, however, all are characterised by relatively low reactivity with regard to isocyanates, due to the steric hindrance of the therein comprised hydroxyl groups. The above mentioned polyols therefore are unsuitable for reaction with aliphatic isocyanates at room temperature, in order to obtain UV-stable non yellowing systems. The reaction with the much more reactive aromatic isocyanates, such as MDI and its derivatives, is possible, the reaction products of the above described polyols with aromatic isocyanates, however, have a great tendency for yellowing at the exposition to light. Furthermore, due to the low reactivity of the secondary hydroxyl groups very fast systems for spraying applications can only be realised in a very restricted scope. Furthermore, the secondary hydroxyl groups very often do not entirely react with the isocynates groups. The remaining not reacted hydroxyl groups often lead to a much enhanced hydrophilicity of the systems and reduce their life-time.

Polyester polyols with enhanced reactivity are described in the patents U.S. Pat. No. 4,656,243, U.S. Pat. No. 4,692,384, U.S. Pat. No. 4,894,430, U.S. Pat. No. 5,260,138 and U.S. Pat. No. 5,319,056. These polyols show a sufficient reactivity to enable a reaction with non-aromatic isocyanates at room temperature In comparison with the above described polyols, however, they have a much reduced hydrophobicity.

BRIEF SUMMARY OF THE INVENTION

Hence, it is a general object of the invention to provide lipid based polyols with high hydrophobicity and simultaneously high reactivity.

A further object of the present invention is a method for the production of such polyols.

Still further objects of the present invention are specific applications of the polymers of the present invention.

The present invention concerns polyols with high reactivity and high hydrophobicity that are obtainable by reacting saturated or unsaturated fatty acids or esters of fatty acids that contain at least one secondary, in particular also a sterically hindered secondary, hydroxyl group, with anhydrides of dicarboxylic acids, in particular cyclic 1,2-dicarboxylic acids, more preferred hexahydrophthalic acid, followed by esterification by means of polyhydroxy compounds, in particular glycols. Preferred fatty acids or esters of fatty acids, respectively, are ricinoleic acid or castor oil.

Such polyols that preferably are produced by the above described method, can be described as compounds of formula (I)

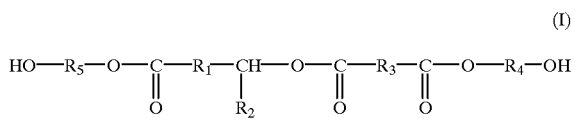

in which $R_1$ represents an alkylene group or an alkenylene group, in particular a group with 5 to 20 C-atoms, much preferred the group —$(CH_2)_7$—CH=CH—$CH_2$—, $R_2$ represents hydrogen or in particular an alkyl group or alkenyl group with preferably 2 to 20 C-atoms, much preferred the group —$(CH_2)_5$—$CH_3$, $R_3$ represents an aliphatic, in particular a cylic aliphatic, or aromatic group, $R_4$ represents a linear or branched alkylene group, in particular neopentylene, and $R_5$=$R_4$ or an optionally hydroxyl group substituted linear or branched alkylene group that is different from $R_4$, in particular a neopentylene group or a hydroxymethyl substituted ethylene group.

DETAILED DESCRIPTION OF THE INVENTION

In view of the reaction preferably used for the production of the polyols, usually—in particular starting from esters of fatty acids—a mixture of compounds of formula (I) is obtained, for example mixtures that comprise such compounds of formula (I), in which $R_4$ stems from the polyol and $R_5$ either from the polyol or from the alcohol of the ester of the fatty acid used as starting material.

Due to their high lipid portion and the primary hydroxyl groups, the inventive polyols combine a high reactivity with a high hydrophobicity. Said polyols therefore are especially suitable for use in combination with aliphatic isocyanates in order to produce light-fast polyurethane compositions, and in combination with aromatic isocyanates for the production of polyurethane compositions with high reactivity and high weather-proofness. The inventive polyurethanes, i.a. because of the high readiness of the polyol to react, are characterised by excellent mechanical properties. Furthermore, the obtained binders are characterised by excellent compatibility with themselves and with the filler systems usually used in polyurethane compositions, thereby enabling the production of systems with superior aesthetics.

Optionally, water formed during final esterification can be removed by adding an entrainer, in particular neopentyl glycol.

Furthermore, the production of the binders of the present invention is especially simple and cheap, since the reaction of the lipid part bound hydroxyl groups with the anhydride, in spite of the low reactivity of the lipid part bound hydroxyl groups, is complete and proceeds at relatively low temperatures. The such obtained half esters can selectively be reacted with polyhydroxyl compounds, such as glycols, resulting in the formation of primary hydroxyl groups.

The production is e.g. made in that at least one fatty acid comprising at least one secondary hydroxyl group, or at least one ester of such a fatty acid, or mixtures thereof are reacted with a slight excess of at least one anhydride of a dicarboxylic acid, in particular a cyclic 1,2-dicarboxylic acid, at 150° C. to 200° C. for about forty minutes. Preferred lipid components are ricinoleic acid and castor oil. Preferred ratios of the mixture of dicarboxylic anhydride to hydroxyl groups of the lipid component are 0.7:1 to 1.5:1, particularly preferred are ratios of 1.05:1 to 1.1:1. Reasonably, the reaction is performed in the presence of esterifying catalysts. Suitable catalysts are for example usual esterification catalysts, such as e.g. zinc acetate, zinc oxide, antimony trioxide, esters of titanic acid, such as isopropyl titanate, tetrabutyl-0-titanate, esters of zirconic acid in concentrations of 0.1 to 0.5% of the reaction composition. Suitable dicarboxylic anhydrides are anhydrides that lead to stable half esters. Such dicarboxylic anhydrides are in particular anhydrides of cyclic 1,2-dicarboxylic acids, especially preferred cycloaliphatic dicarboxylic anhydrides. In the scope of this invention cyclic 1,2-dicarboxylic acids are carboxylic acids that have acid groups at adjacent carbon atoms of a cycle. Examples for anhydrides that are usable in the scope of the present invention comprise hexahydrophthalic anhydride, succinic anhydride, glutaric anhydride, methylhexahydrophthalic anhydride, tetrahydrophthalic anhydride, endomethylenetetrahydrophthalic anhydride (Nadig-anhydride) and the derivatives thereof, the liquid mixtures of tetrahydrophthalic anhydride and hexahydrophthalic anhydride and cycloaromatic dicarboxylic anhydrides such as phthalic anhydride. Especially preferred for the production of light-fast systems is pure hexahydrophthalic anhydride, or hexahydrophthalic anhydride liquefied with tetrahydrophthalic anhydride, and/or succinic anhydride.

In a next step, at least one polyhydroxyl compound is added to the reaction mixture in a ratio of hydroxyl groups to carboxylic acid groups of 1.8 to 2.2, and a further esterification is performed during about two hours at 230° C.–250° C. Preferred polyhydroxyl compounds are neopentyl glycol, 1,3-propanediol, 1,3-butanediol, 1,4-butanediol, 1,5-pentanediol and 1,6-hexanediol. Also suitable are trimetylolpropane, trimetylolethane, trimetylolmethane, pentaerythritol, dietylene glycol, tripropylene glycol, 1,2-propanediol, isomers of 1,4-butanediol, isomers of 1,5-pentanediol, isomers of 1,6-hexanediol, dipropylene gloycol, dimethylolpropionic acid, 1,4-cyclohexanedimethanol and isomers, 1,4-bis(2-hydroxyethoxy)cyclohexane, decamethyleneglycol, norbornyleneglycol, 1,4-benzenediethanol, 2,4-dimethyl-2-ethylenehexane-1,3-diol, 2-butene-1,4-diol, trimethylolethane, trimethylolpropane, ethoxylated trimethylolpropane, trimethylolpropane monoallylehter, trimethylolhexane, 1,2,4-butanetriol, pentaerythritol, dipentaerythritol, pentaerythrit, ethyleneglycol, diethyleneglycol, dipropyleneglycol. The above mentioned polyhydroxyl compounds can be used alone or as mixtures.

Finally the reaction mixture is cooled. Said reaction mixture can than be used without further purification.

The inventive polyester polyols are especially suitable for use as component or constituent of a component in two component polyurethane coatings and polyurethane adhesives. Such two component systems with e.g. hexamethylenediisocyanate(HDI)-cyclotrimerisate as curing agents are very well suitable as light-fast coatings.

A further object of the present invention are two component polyurethane coatings or two component polyurethane adhesives wherein the resin component contains or consists of an inventive polyester polyol and the curing component contains or consists of a curing agent on isocyanat basis, for light-fast coatings preferably hexamethylenediisocyanate (HDI)-cyclotrimerisate.

The reaction starting from castor oil and hexahydrophthalic anhydride (HHPA) followed by neopentylglykol (NPG) is shown in the following schema, whereby in the final product, besides of the fully esterified products represented in the second step furthermore fully esterified diglycerides and triglycerides can be present.

In the scheme, the double bound within the fatty acid group is only marked as bold print.

Castor oil

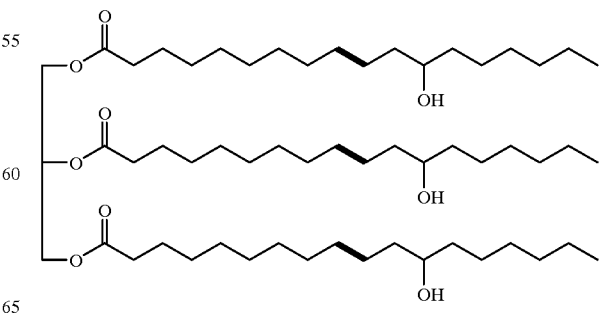

1st step: Formation of the half ester from castor oil and HHPS

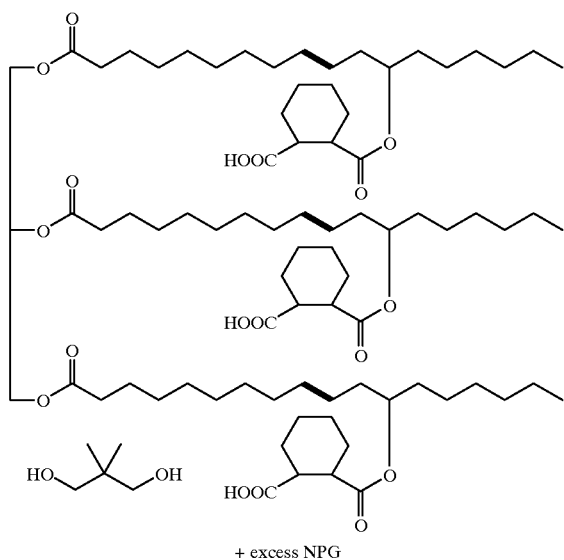

+ excess NPG

2nd step: Full esterification of the half ester with NPG

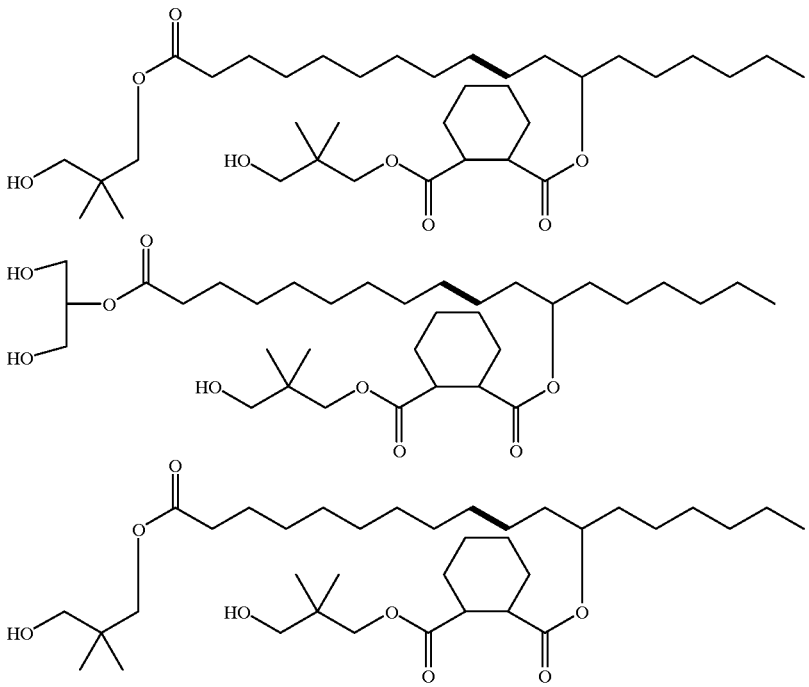

EXAMPLES

Example 1

To a laboratory reactor with stirrer and distillation head, 940 g castor oil of quality "first pressing", water content of at most 0.25%, were added. With stirring, 420 g hexahydrophthalic anhydride that were liquefied in a drying oven at 40° C. to 60° C. were added to said castor oil. Then 4 g zinc acetate were added as esterification catalyst and the mixture was heated to 180° C. within 20 minutes and with further stirring. The half ester formation between castor oil and hexahydrophthalic anhydride was then controlled at 180° C. by measuring the increase of viscosity (measurements with cone and plate viscosimeter at 23° C.). After about forty minutes of reaction time, the mixture reached a viscosity of 22'400 mpas.

320 g neopentylglycol and 320 g trimethylol-propane were added to said batch and a final esterificafion was performed during about 1½ hours at 245° C. to 250° C. During the reaction, about 70 ml condensate were removed by distillation. After cooling and bottling of the batch, a polyester polyol with the following specifications was obtained:

| | |
|---|---|
| Aspect: | yellow, clear, viscous liquid |
| KOH-value: | 295 |
| Hydroxyl equivalent: | 190 g/eq. |
| Water content: | 0.1% |
| Viscosity (23° C.) | 10'600 mPas |

Example 2

To a laboratory reactor with stirrer and distillation head, 920 g castor oil of quality "first pressing", water content of at most 0.25%, were added, with stirring, 320 g succinic anhydride in powder form were added to said castor oil. Then 4 g esterification catalyst (antimony trioxide) were added and (in order to avoid too extensive sublimation of succinic anhydride in the reactor) the mixture was slowly heated to 170° C. within 20 minutes and with further stirring for half-ester formation. 720 g neopentyl glycol were added to said batch and a final esterification was performed during about 2 hours at 240° C. During the final esterification, about 80 ml distillate with a high content of neopentylglycol were collected. After cooling and bottling of the batch, a polyester polyol with the following specifications was obtained:

| Aspect: | yellow, clear, viscous liquid |
|---|---|
| KOH-value: | 261 |
| Hydroxyl equivalent: | 215 g/eq. |
| Water content: | <0.1% |
| Viscosity (23° C.) | 1'500 mPas |

Example 3

As described in Example 1 a half-ester synthesis was first performed, starting from 960 g castor oil, 440 g liquefied hexahydrophthalic anhydride and 4 g esterification catalyst.

Then about 480 g neopentylglycol and 120 g of granular pentaerythritol propane were added and a final esterification was performed during about 1½ hours at 245° C. to 250° C. While neopentylglycol readily dissolved, pentaerythritol remained undissolved until about 220° C. AT the end no bubble formation due to condensate cleavage (water) could be observed anymore. During cooling, at about 210° C. again about 5 ml distillate were removed under vacuum in order to improve the drying, such that a total of 76 ml distillate were collected. After cooling and bottling of the batch, a polyester polyol with the following specifications was obtained:

| Aspect: | yellow, slightly turbid viscous liquid |
|---|---|
| KOH-value: | 261 |
| Hydroxyl equivalent: | 215 g/eq. |
| Water content: | <0.1% |
| Viscosity (23° C.) | 10'000 mPas |

Example 4

First a half-ester synthesis was performed as described in Examples 1 and 3, starting from 1000 g castor oil, 440 g liquefied hexahydrophthalic anhydride and 4 g esterification catalyst.

Then 280 g neopentylglycol and 280 g granular pentaerythritol are added and a final esterification is performed during about 1½ hours at 245° C. to 250° C. While neopentylglycol readily dissolved, pentaerythritol remained undissolved until about 220° C. At the end no bubble formation due to condensate cleavage (water) could be observed anymore. During cooling, at about 210° C., again about 7 ml distillate were removed under vacuum in order to improve the drying, such that a total of 70 ml distillate was collected. After cooling and bottling of the batch, a polyester polyol with the following specifications was obtained:

| Aspect: | yellow, viscous liquid with medium turbidity |
|---|---|
| KOH-value: | 280 |
| Hydroxyl equivalent: | 200 g/eq. |
| Water content: | <0.1% |
| Viscosity (23° C.) | 34'000 mPas. |

Example 5

To the reactor, 840 g ricinoleic acid of quality Edenor RI 90 of Henkel (hydroxyl value 159, acid number 180), were added. With stirring, 440 g hexahydrophthalic anhydride that were liquefied in a drying oven at 40° C. to 60° C. were added to said ricinoleic acid. Then 4 g esterification catalyst (zinc oxide) were added and the mixture was heated to 180° C. within 20 minutes and with further stirring.

340 g neopentylglycol and 400 g trimethylol-propane were added to the above described batch and a final esterification was performed during about 1½ hours at 245° C. to 250° C. At the end, no bubble formation due to condensate cleavage (water) was observable in the batch anymore. During the final esterification, a total of about 120 ml condensate was obtained. After cooling and bottling of the batch, a polyester polyol with the following specifications was obtained:

| Aspect: | yellow, clear, viscous liquid |
|---|---|
| KOH-value: | 274 |
| Hydroxyl equivalent: | 205 g/eq. |
| Water content: | 0.1% |
| Viscosity (23° C.): | 12'000 mPas |

While there are shown and described presently preferred embodiments of the invention, it is to be distinctly understood that the invention is not limited thereto but may be otherwise variously embodied and practised within the scope of the following claims.

What is claimed is:

1. Polyester polyols of formula (I)

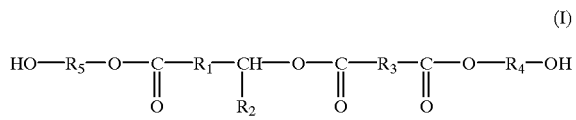

(I)

wherein $R_1$ represents an alkylene group or an alkenylene group of 5–20 carbon atoms, $R_2$ represents hydrogen or an alkyl group or an alkenyl group of 2–20 carbon atoms, $R_3$ represents a cyclic aliphatic group of 6 to 7 carbon atoms, $R_4$ represents a linear or branched alkylene group of 2 to 10 carbon atoms, and $R_5=R_4$, or $R_5$ represents an optionally hydroxyl group substituted linear or branched alkylene group of 2 to 10 carbon atoms that differs from $R_4$, or mixtures of compounds of formula (I).

2. The polyester polyols of claim 1 producible by half ester formation between at least one cyclic aliphatic dicarboxylic anhydride and a saturated or unsaturated fatty acid carrying at least one secondary hydroxyl group, or an ester of a respective fatty acid, or a mixture thereof, and final esterification by at least one polyol.

3. The polyester polyols of claim 2 wherein the ester of a fatty acid is castor oil and the fatty acid is ricinoleic acid.

4. The polyester polyols of claim 2 wherein the ratio between anhydride and hydroxy-equivalent of castor oil is from 0.5:1 to 2:1.

5. The polyester polyols of claim 2 wherein the at least one cyclic aliphatic dicarboxylic anhydride is a cyclic 1,2-dicarboxylic anhydride in pure form or mixed with tetrahydrophthalic anhydride and/or succinic anhydride.

6. The polyester polyols of claim 2 wherein the polyol for the final esterification is a polyol with exclusively primary hydroxyl groups.

7. The polyester polyols of claim 2 wherein the hydroxyl equivalent is from 150 to 250.

8. The polyester polyols of claim 2 wherein said polyols are obtainable by the reaction of the at least one fatty acid or the at least one ester of a fatty acid with the at least one anhydride of a cyclic aliphatic dicarboxylic acid at temperatures of 150° C. to 200° C. in the presence of an esterification catalyst and final esterification with the at least one polyhydroxyl compound at 230° C. to 250° C.

9. A method for the production of polyester polyols of claim 1, wherein at least one saturated or unsaturated fatty acid and/or at least one ester of a saturated or unsaturated fatty acid is reacted with at least one an hydride of a cyclic aliphatic dicarboxylic acid, under formation of a half ester, wherein the fatty acid has at least one secondary hydroxyl group, and wherein the formed half ester is finally esterified with at least one polyhydroxyl compound.

10. The method of claim 9 wherein the fatty acid is ricinoleic acid and the ester of fatty acid is castor oil.

11. The method of claim 10 wherein the ratio between anhydride and hydroxy-equivalent of castor oil is from 0.5:1 to 2:1.

12. The method of claim 9 wherein the at least one cyclic aliphatic dicarboxylic anhydride is a cyclic 1,2-dicarboxylic anhydride in pure form or mixed with tetrahydrophthalic anhydride, and/or succinic anhydride.

13. The method of claim 9 wherein the polyol for the final esterification is a polyol with exclusively primary hydroxyl groups.

14. The method of claim 9 wherein the hydroxyl equivalent is from 150 to 250.

15. The method of claim 9 wherein the reaction of the at least one fatty acid or the at least one ester of a fatty acid with the at least one anhydride of a cyclic aliphatic dicarboxylic acid is performed at temperatures of 150° C. to 200° C. in the presence of an esterification catalyst and final esterification with the at least one polyhydroxyl compound at 230° C. to 250° C.

16. The method of claim 9 wherein the water formed during final esterification is removed by an entrainer.

17. The polyester polyols of claim 1, wherein $R_1$ represents $-(CH_2)_7-CH=CH-CH_2-$, $R_2$ represents $-(CH_2)_5-CH_3$, and $R_4$ represents neopentylene.

18. The polyester polyols of claim 5, wherein said cyclic 1,2-dicarboxylic anhydride is hexahydrophthalic anhydride.

19. The polyester polyols of claim 6, wherein said polyol is neopentylglycol.

20. The method of claim 9, wherein the fatty acid has at least one sterically hindered secondary hydroxyl group.

21. The method of claim 12, wherein the cyclic 1,2-dicarboxylic anhydride is hexahydrophthalic anhydride.

22. The method of claim 13, wherein said polyol is neopentyl glycol.

* * * * *